(12) United States Patent
Husmark et al.

(10) Patent No.: US 12,305,336 B2
(45) Date of Patent: May 20, 2025

(54) PLY FIBROUS PRODUCT

(71) Applicant: Essity Hygiene and Health Aktiebolag, Gothenburg (SE)

(72) Inventors: Ulrika Husmark, Gothenburg (SE); Frida Ryttsén, Gothenburg (SE)

(73) Assignee: Essity Hygiene and Health Aktiebolag, Gothenburg (SE)

( * ) Notice: Subject to any disclaimer, the term of this patent is extended or adjusted under 35 U.S.C. 154(b) by 203 days.

(21) Appl. No.: 17/798,746

(22) PCT Filed: Feb. 17, 2020

(86) PCT No.: PCT/SE2020/050182
§ 371 (c)(1),
(2) Date: Aug. 10, 2022

(87) PCT Pub. No.: WO2021/167503
PCT Pub. Date: Aug. 26, 2021

(65) Prior Publication Data
US 2023/0071802 A1 Mar. 9, 2023

(51) Int. Cl.
*D21H 27/38* (2006.01)
*D21H 13/14* (2006.01)
*D21H 13/24* (2006.01)
*D21H 17/15* (2006.01)

(52) U.S. Cl.
CPC ............. *D21H 27/38* (2013.01); *D21H 13/14* (2013.01); *D21H 13/24* (2013.01); *D21H 17/15* (2013.01)

(58) Field of Classification Search
CPC ........ D21H 27/38; D21H 13/14; D21H 13/24; D21H 17/15; D21H 27/30; D21H 11/12; D21H 11/20; D21H 13/08; D21H 17/14; D21H 19/12; D21H 21/36; D21H 23/22; D21H 25/02; D21H 27/002; D06M 2101/06; D06M 2400/01; D06M 13/192; D06M 16/00; C08B 3/12; C08B 3/20; C08L 1/10; D04H 1/425
See application file for complete search history.

(56) References Cited

U.S. PATENT DOCUMENTS

| | | | |
|---|---|---|---|
| 3,526,048 A | 9/1970 | Rowland et al. | |
| 3,671,184 A | 6/1972 | Cuculo | |
| 4,820,307 A | 4/1989 | Welch et al. | |
| 6,592,717 B2 * | 7/2003 | Jewell | D06M 13/192 |
| | | | 162/146 |
| 6,962,608 B1 | 11/2005 | Sun et al. | |
| 11,207,441 B2 * | 12/2021 | Ahoniemi | A61L 15/18 |
| 12,053,360 B2 * | 8/2024 | Husmark | A61L 15/22 |
| 2014/0039432 A1 | 2/2014 | Dunbar et al. | |
| 2019/0358360 A1 * | 11/2019 | Schoolfield | A61L 15/20 |
| 2023/0051090 A1 * | 2/2023 | Husmark | A61L 15/46 |

FOREIGN PATENT DOCUMENTS

| | | | | |
|---|---|---|---|---|
| CN | 1039456 A | | 2/1990 | |
| CN | 101591854 A | * | 12/2009 | |
| CN | 101591854 B | * | 7/2011 | |
| CN | 108691096 A | | 10/2018 | |
| CN | 108691096 B | * | 6/2020 | ............. D04H 1/425 |
| DE | 60315005 T2 | * | 4/2008 | ......... C11D 11/0017 |
| DE | 212009000107 U1 | | 6/2011 | |
| EP | 0651088 A1 | | 5/1995 | |
| EP | 1270598 A1 | | 1/2003 | |
| EP | 3046592 A1 | | 7/2016 | |
| EP | 3187047 A1 | | 7/2017 | |
| JP | 2001131872 A | | 5/2001 | |
| JP | 2013112903 A | | 6/2013 | |
| JP | 2016079530 A | | 5/2016 | |
| WO | 9525846 A1 | | 9/1995 | |
| WO | 9827262 A1 | | 6/1998 | |
| WO | 0022222 A1 | | 4/2000 | |
| WO | 0039389 A1 | | 7/2000 | |
| WO | 2010031195 A2 | | 3/2010 | |
| WO | 2014095426 A1 | | 6/2014 | |
| WO | 2015039218 A1 | | 3/2015 | |
| WO | WO-2021167503 A9 | * | 9/2022 | ............... C08B 3/12 |

OTHER PUBLICATIONS

International Search Report (PCT/ISA/210) and Written Opinion (PCT/ISA/237) mailed on Oct. 21, 2020, by the Swedish Patent Office as the International Searching Authority for International Application No. PCT/SE2020/050182.
Office Action (First Office Action) issued on Jan. 3, 2023, by the Chinese Patent Office in corresponding Chinese Patent Application No. 202080092676.1, and an English Translation of the Office Action. (19 pages).
Extended European Search Report dated Sep. 27, 2023, issued in corresponding European Application No. 20919452.1. (8 pages).
(Continued)

*Primary Examiner* — Jose A Fortuna

(74) *Attorney, Agent, or Firm* — Buchanan Ingersoll & Rooney PC

(57) ABSTRACT

A ply fibrous product comprises at least one ply selected from a nonwoven ply and a tissue paper ply, wherein the at least one ply selected from a nonwoven ply and a tissue paper ply comprises cellulosic fibers comprising an organic polycarboxylic acid and wherein the organic polycarboxylic acid has at least one carboxyl group covalently bound to the cellulosic fibers and at least one free carboxyl group. Due to the presence of covalent chemical bonds between a carboxyl group of the polycarboxylic acid and hydroxy groups of the cellulosic fibers present in all substrates, the ply fibrous products display a long-lasting acidic pH even after having been rinsed with water. In some embodiments a long-lasting acidic pH may be achieved in the nonwovens treated with an organic polycarboxylic acid even after washing with a washing detergent.

17 Claims, 3 Drawing Sheets

(56) References Cited

OTHER PUBLICATIONS

Office Action (Text of the Second Office Action) issued on Sep. 26, 2023, in corresponding Chinese Patent Application No. 202080092676.1 and English translation of the Office Action. (20 pages).
B. Li et al., "Preparation and catalytic performance of Fe(III)-citric acid modified cotton fiber complex as a novel cellulose fiber-supported heterogeneous photo-Fenton catalyst", Cellulose, 2015, vol. 22, pp. 1295-1309.
S.B. Vukusic et al., "Cotton textiles modified with citric acid as efficient anti-bacterial agent for prevention of nosocomial infections", Croatian Medical Journal, Feb. 2011, vol. 52 No. 1, pp. 68-75. https://www.ncbi.nlm.nih.gov/pmc/articles/PMC3046493/.
Jiang et al., "Domestic Textile Materials", Donghua University Press, Aug. 2013, p. 135, with English translation.
Wang et al., "Development and Application of Healthy Textiles", China Textile Press, Nov. 2005, pp. 175-176, with English translation.
Office Action issued on Jul. 30, 2024, by the Chinese Patent Office in corresponding Chinese Patent Application No. 202080092676.1, and an English Translation of the Office Action. (19 pages).

\* cited by examiner ial pH. Generally, a slightly acidic pH may be beneficial for skin health due to increased barrier properties and balanced skin microflora. Bacterial growth may further lead to different forms of skin irritation and primary or secondary skin infections.

To address these issues, it has been proposed to topically treat ply fibrous products such as nonwovens with antimicrobial silver or other metal-based antimicrobial agents. However, silver is of limited supply and the methods for obtaining and processing silver have a negative environmental impact. There is also a general concern regarding the potential development of resistant bacteria. Furthermore, the content of silver particles within the product may be reduced upon subjecting the ply fibrous product, in particular the nonwoven fabric, to multiple washing cycles which may ultimately lead to limited reusability.

Further, there is currently a tissue-based handkerchief on the market (TEMPO® protect) which has been treated with benzalkonium chloride as antibacterial agent. The benzalkonium chloride is not firmly bound to the cellulosic fibers of the tissue plies.

Viscose-based nonwoven wipes treated with zinc pyrithione, which is not necessarily permanently attached, for cleaning hard surfaces are also known. Zinc pyrithione is a coordination complex of zinc having fungistatic and bacteriostatic properties which, if released, may be toxic to aquatic life.

Moreover, due to bacterial metabolism, odorous byproducts such as volatile sulfur- or amine-based compounds may be formed (see Hughes et al.; *Oral malodour—a review*, Archives of oral biology 53, suppl. I (2008) S1-S7). For example, *E. coli* is known for converting L-tryptophan to malodorous compounds like indole and ammonia (see Han et al., *Environmental Factors Affecting Indole Production in Escherichia coli*, Res Microbiol. 2011; 162(2): 108-116). The formation of odors, for example in cleaning wipes, may both cause unhygienic conditions and discomfort for the user.

Thus, it would be desirable to provide a ply fibrous product, in particular a nonwoven product or a tissue product, that provides a skin-friendly and durable antibacterial treatment and that is safe for the environment and user. It would also be desirable to use antibacterial agents with zero or very limited risk of developing resistant bacteria.

It would further be desirable to provide a ply fibrous product that exhibits a long-lasting antibacterial effect even after rinsing with water and/or one that provides a greater level of hygiene relative to conventional ply fibrous products.

SUMMARY

The present disclosure relates to:
1. a ply fibrous product comprising at least one ply selected from a nonwoven ply and a tissue paper ply, wherein at least one ply selected from a nonwoven ply and a tissue paper ply comprises cellulosic fibers comprising an organic polycarboxylic acid, and wherein the organic polycarboxylic acid has at least one carboxyl group covalently bound to the cellulosic fibers and at least one free carboxyl group.

The present disclosure includes the following embodiments ("items"):

2. The ply fibrous product according to item 1, wherein the organic polycarboxylic acid has two to ten carboxyl groups, preferably three to five carboxyl groups, and more preferably three carboxyl groups.

3. The ply fibrous product according to item 1 or 2, wherein the organic polycarboxylic acid has 2 to 12 carbon atoms in a main chain e.g., 4 to 6 carbon atoms in a main chain, wherein the compound is preferably selected from the group consisting of citric acid, isocitric acid, citraconic acid, tartaric acid, itaconic acid, 1,2,3-propanetricarboxylic acid, 1,2,3,4-butanetetracarboxylic acid, glutaric acid, alpha-ketoglutaric acid, malic acid, malonic acid, 2-hydroxymalonic acid, oxalic acid, oxalosuccinic acid, succinic acid, carboxy succinic acid, 1,2 dimethylsuccinic acid, adipic acid, pimelic acid, 2-methyl tricarballylic acid, aconitic acid, 1,2,4-butane tricarboxylic acid, polymers of acrylic acid, and mixtures thereof, wherein the acid is preferably citric acid.

4. The ply fibrous product according to any one of items 1 to 3, wherein at least one carboxyl group is covalently bound to the cellulosic fibers by forming an ester group with a cellulosic hydroxy group.

5. The ply fibrous product according to any one of items 1 to 4, wherein at least one ply is a nonwoven ply comprising
(A) cellulosic fibers selected from
(A1) natural fibers, preferably pulp fibers or natural fibers originating from cotton, bagasse, hemp, linen, sisal, straw, flax, kapok, millkweed, sisal, abaca, pineapple, flax, hemp, jute, or kenaf, and more preferably pulp fibers, wherein the pulp fibers may be selected from softwood and hardwood fibers, and
(A2) semi-synthetic fibers, preferably viscose, rayon or lyocell, more preferably viscose or lyocell,
wherein the weight proportion of cellulosic fibers based on the total weight of the ply fibrous product is preferably 10 to 100 wt.-%, more preferably 10 to 80 wt.-%, in particular 25 to 75 wt.-%, such as 40 to 70 wt.-%, and
wherein the nonwoven ply optionally comprises
(B) synthetic fibers selected from the group consisting of polyethylene, polypropylene, polyethylene terephthalate, and polyester, wherein the weight proportion of non-cellulosic fibers based on the total weight of the ply fibrous product is preferably 0 to 90 wt.-%, more preferably 20 to 90 wt.-%, in particular 25 to 75 wt.-%, such as 30 to 60 wt.-%.

6. The ply fibrous product according to any one of items 1 to 5, wherein the ply fibrous product is a multiply tissue product, preferably comprising from 2 to 6 superposed plies, more preferably 2 to 4 plies.

7. The ply fibrous product according to any one of items 1 to 6, wherein the product is selected from handkerchiefs, napkins, paper hand towels, facial tissues, wound care dressings and cleaning wipes.

8. The ply fibrous product according to any one of items 1 to 7, wherein the cellulosic fibers comprising an organic polycarboxylic acid are obtained by treating cellulosic fibers with an organic polycarboxylic acid, preferably with an organic polycarboxylic acid as defined in any one of items 2 to 3, in the presence of an activator.

9. The ply fibrous product according to any one of items 1 to 8, wherein the surface of the ply fibrous product has a pH after rinsing in a range of from 2.0 to 5.5, preferably 2.5 to 5.5, more preferably 3.0 to 5.0 and/or a pH after washing in a range of from 2.0 to 5.0, preferably 2.5 to 4.5, more preferably 3.0 to 4.5.

10. Method for producing a ply fibrous product, comprising the steps of
(α) treating cellulosic fibers with a treatment solution comprising one or more organic polycarboxylic acid, or optionally a mixture of one or more organic polycarboxylic acids with salts thereof, preferably an organic polycarboxylic acid as defined in any one of items 2 to 4, and an activator; (β) optionally drying; and (γ) curing to obtain the ply fibrous product.

11. The method according to item 10, wherein at least one, preferably all of the following conditions are fulfilled:
(i) the concentration of the organic polycarboxylic acid in the treatment solution is 2 to 80 wt.-%, preferably 2.5 to 50 wt.-% and more preferably 10 to 20% wt.-% based on the total weight of the treatment solution,
(ii) the treatment time is 10 sec to 2 h, preferably 30 sec to 1 h 15 min, in particular 5 min,
(iii) the curing time is 1 to 10 min, preferably 2 to 8 min, in particular 5 min,
(iv) the curing temperature is 100° C. to 200° C., preferably 110° C. to 180° C., more preferably 140° C. to 170° C.

12. The ply fibrous product according to item 8 or the method according to items 10 or 11, wherein the activator is selected from the group consisting of sodium hypophosphite monohydrate, N-N'-carbonyldiimidazole, p-toluenesulfonylchloride and N,N'-dicyclohexyl-carbodiimide in combination with 4-pyrrolidino-pyridine or 4-dimethylaminopyridine.

13. Use of the ply fibrous product according to any of items 1 to 9 as
(I) antibacterial wipes for personal hygiene, preferably handkerchiefs, paper hand towels, toilet paper, pre-moistened toilet paper, baby wipes, wipes for feminine hygiene,
(II) wound care dressings,
(III) antibacterial wipes for food service cleaning, at home and in food production,
(IV) as cleaning wipe suitable to clean surfaces, preferably hard surfaces in a domestic or hospital environment.

14. Use of the ply fibrous product as defined in any one of items 1 to 9 for reducing the amount of unwanted bacteria or inhibiting their growth, wherein the unwanted bacteria are selected from the group consisting of *E. coli*, *E. faecalis*, *S. epidermidis*, *S. aureus* and *K. pneumonia*.

15. Use of the ply fibrous product according to item 14, wherein the log CFU/ml of unwanted bacteria is reduced at least 5%, such as 10-20%, in particular 15%.

Where the present description refers to "preferred" embodiments/features, combinations of these "preferred" embodiments/features shall also be deemed as disclosed as long as this combination of "preferred" embodiments/features is technically meaningful.

FIGURES

DETAILED DESCRIPTION OF PARTICULAR EMBODIMENTS

1 Definitions

Figure 1A:
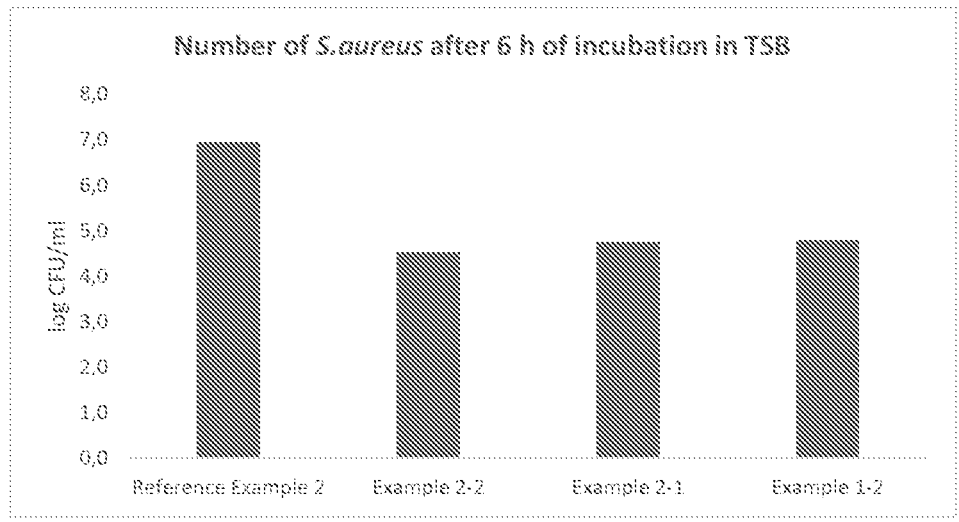
FIGS. 1a-1b show bacteria numbers after 6 hours of contact with *S. aureus* and *K. pneumonia* in viscose- and viscose-PET-based nonwovens treated with organic polycarboxylic acids compared to untreated material.

The term "ply" as used herein refers to distinguishable and typically separable cut-to-size webs of tissue paper as are obtained after processing ("converting") one or more base (raw) tissue paper webs. Each individual ply may comprise one or more layers e.g., one, two, three or four layers. In the case of nonwovens, the term "ply" as used herein refers to distinguishable and typically separable cut-to-size webs of nonwoven.

A "multiply tissue product", is defined as a tissue preferably comprising from 2 to 6 superposed plies, for example from 2 to 4 plies.

The term "nonwoven" is very common in the art and may be further defined in the manner described in ISO 9092: 2011, also for the purpose of the present disclosure.

"Tissue paper" is defined as the base paper produced by a paper machine and comprises natural fibers. As "tissue paper ply" we understand the one-ply based tissue as obtained from the tissue machine. The tissue paper ply is made by a process comprising the steps of: forming an aqueous suspension of pulp fibers i.e., the so-called "furnish," depositing the aqueous suspension onto a wire to form a wet web, dewatering, drying and creping of the web.

In connection with tissue paper plies the term "layer" refers to a stratum within the web having a defined fiber composition. The one or more layers is/are formed by depositing one or more streams of pulp furnish onto a wire with a pressurized single or multi-layered headbox. This technique is well known to those skilled in the art. It renders possible the use of different kinds of fibers in each layer of the web.

We understand "pulp" according to the definition of ISO 4046-2 as a fibrous material, generally of vegetable origin, made ready for use in further manufacturing processes. "Pulp fibers" as used herein comprise pulp fibers from chemical pulp, such as kraft, sulfate or sulfite, mechanical pulp, thermo-mechanical pulp, chemo-mechanical pulp and/or chemo-thermo-mechanical pulp, abbreviated as CTMP. Pulps derived from both deciduous (hardwood) and coniferous (softwood) may be used. Fibers may also come from non-wood plants e.g., cereal straws, bamboo, jute or sisal. The pulps employed may be a primary fibrous material ("virgin fibers"). Optionally, they may be a secondary fibrous material ("recycled pulps").

"Filaments" are fibers that in proportion to their diameter are very long, in principle endless. "Staple fibers" refer to fibers of discrete length.

"dtex" is a unit for linear density of fibers and yarns and provides the weight in grams of 10 km of the fiber or yarn.

"Cellulosic fibers" contain carbohydrate units comprising e.g., β(1→4) linked D-glucose units with free cellulosic hydroxy groups which allow the attachment of an organic polycarboxylic acid via a covalent bond.

"Cellulosic hydroxy group" is to be understood as a hydroxy group which is able to react with an acid, preferably an organic polycarboxylic acid, to form covalent bonds (ester carbonyl bonds).

We understand "covalently bound" as a covalent ester bond formed between the cellulosic hydroxy group and at least one, preferably 1 or 2 of the carboxyl groups of the organic polycarboxylic acid. Thereby, permanent attachment of the organic polycarboxylic acid to the cellulosic fibers within the nonwoven is achieved.

"Free carboxyl group" is to be understood as a carboxyl group that is able to release a proton.

The term "substituted" as used herein means being substituted with one or more groups selected from the group consisting of a halogen group, a carbonyl group, an alkyl group, an alkenyl group, an alkoxy group, a cycloalkyl group, an arylalkenyl group, an aryl group, an aryloxy group, a heteroaryl group, an aryl group, a nitrile group, a hydroxyl group, and a heterocyclic group, as well as combinations of these groups.

The term "oxo group" as used in the present disclosure is to be understood as an oxygen linked to another atom by a double bond.

"Natural fibers" are defined as fibers originating from natural sources such as plant material.

"Semi-synthetic fibers" (sometimes also referred to as "regenerated fibers") are fibers originating from natural sources such as plant material that are regenerated as cellulosic fibers.

"Synthetic fibers" are fibers originating from synthetic materials and are equivalently described as "non-cellulosic fibers" in the present disclosure.

The "dry weight of the substrates" as used in the present disclosure is to be understood as the weight of the substrate (ply fibrous product) that is determined after conditioning at 50% relative humidity and at 20° C.

"Rinsing" is to be understood as a temporary exposure of the ply fibrous product to water, by dipping the ply fibrous product for example into lukewarm water.

"Washing" is to be understood as cleaning the ply fibrous product, such as a nonwoven, in a household washing machine. The ply fibrous product, in particular nonwoven, may thus be subjected to an aqueous solution containing detergent without losing its structural features.

"Activator" is defined as a chemical compound capable of activating carboxylic acid groups in order to render them reactive enough towards cellulosic hydroxy groups in order to generate ester bonds between the carboxylic acid groups and the cellulosic OH groups. In one embodiment the activator is capable of dehydrating carboxylic acid groups, which may lead to the formation of an inner anhydride of an organic polycarboxylic acid, which is an anhydride formed by the elimination of water from a single molecule.

"Curing" is defined as the step that promotes the chemical reaction between the organic polycarboxylic acid and the cellulosic hydroxy group in order to form a covalent ester bond. In one embodiment curing also includes drying of the fibrous product.

We understand the term "treatment solution" as the solution that contains the organic polycarboxylic acid and optionally a salt thereof, wherein the optionally present salt thereof is the salt corresponding to the selected acid, which may be an activator for carboxylic acid groups. The treatment solution may be an aqueous solution.

The unit "CFU/ml" (colony-forming unit/ml) relates to the number of viable bacteria cells per millilitre of a sample. "Unwanted bacteria" are to be understood as bacteria that may be pathogenic or that are nosocomial bacteria. In one embodiment, unwanted bacteria are associated with the development of odors. In another embodiment, unwanted bacteria are resistant bacteria.

2 Embodiments

The nonwovens of the present disclosure may be manufactured from any method suitable for compositions comprising cellulose in the form of natural fibers, semi-synthetic fibers, or combinations thereof. The nonwovens may comprise natural or semi-synthetic fibers with a fiber length between 1 and 25 mm. The nonwovens in the present disclosure may further comprise substantially continuous filaments. The natural or semi-synthetic fibers and/or the continuous filaments may have a homogenous composition or may be composed of a multicomponent type including, but not limited to, sheath/core bicomponent, core/sheath/sheath bicomponent or tri-component, and side-by-side bi-component. The nonwovens may be wetlaid, airlaid, carded or spun directly into a web. They may also be composites made from different layers of fibers, and those layers may be produced using different methods. Examples include, but are not limited to, layer combinations with meltblown and spunlaid composites.

The nonwovens may be stabilized by many different methods including, but not limited to, thermal bonding by calendaring or hot air or steam or ultrassonic energy, mechanical entanglement using needling or hydroentanglement, or chemical bonding using a binder or a solvent and pressure. The nonwoven may further comprise staple fibers, pulp fibers and/or filaments.

Filaments may have a linear density within the range of from 0.3 to 3 dtex, for example from 0.5 to 2.4 dtex, and specifically from 0.8 to 2.0 dtex. They may be produced by melting and extruding a thermoplastic polymer through fine nozzles. Thereafter, the polymer will be cooled, for example by an air flow blown at and along the polymer streams and solidified into strands that may be treated by drawing, stretching or crimping. Chemicals for additional functions may be added to the surface.

Any thermoplastic polymer that has suitable coherent properties to let itself be drawn out in the molten state, may be used for producing meltblown or spunlaid fibers. Example fibers usable as non-cellulosic fibers (synthetic fibers) are fibers made from polyolefins, such as polyethylene (PE) and polypropylene (PP), or polyesters, such as polylactides and polyethylene terephthalate (PET) or polybutylene terephthalate, or polyamides. Copolymers of these polymers may also be used, as well as natural polymers with thermoplastic properties. The weight proportion of the non-cellulosic fibers based on the total weight of the ply fibrous product may be from 0 to 90 wt.-%, specifically from 20 to 90 wt.-%, and in particular from 25 to 75 wt.-%, such as from 30 to 60 wt.-%.

Filaments may also be produced using natural fibers by chemical treatment to produce a solution comprising cellulose. The filaments may thereafter be spun to semi-synthetic viscose filaments from a cellulose xanthate solution and subsequent treatment with sulfur. Another process to produce semi-synthetic filaments is to produce lyocell filaments using a cellulose comprising solution in NMMO (N-Methyl Morpholine N-Oxide) which is extruded through orifices to form latent filaments which are thereafter solidified into filaments. Depending on the type of fibrous product and its manufacturing technique, these filaments may then be cut to length in order to provide suitable fibers.

The cellulosic fibers according to the present disclosure may for example be produced from virgin pulp raw material. In one embodiment the cellulosic fibers are produced from recycled pulp material. Depending on the storage conditions of the recycled pulp material, some types may be bacterially contaminated. Embodiments described herein may be used to suppress this bacterial contamination. Recycled pulp material may originate from recycled office paper.

Suitable cellulosic fibers to be used in accordance with the present disclosure may contain the long-chain fibrous cellulose portion as a main structure-building component, which is present in naturally occurring cellulose-containing cells, in particular those of lignified plants. The fibers may be isolated from lignified plants by digestion steps removing or reducing the content of lignin and other extractables and optional bleaching steps.

The weight proportion of the cellulosic fibers based on the total weight of the ply fibrous product may be in the range of 10 to 100 wt.-%, specifically from 10 to 80 wt.-%, and in particular from 25 to 75 wt.-%, such as from 40 to 70 wt.-%.

Cellulosic fibers may be selected from natural fibers especially those that have a capacity to absorb water and tendency to help in creating a coherent sheet. In one specific embodiment natural fibers originate from seed hair fibers, such as cotton, kapok or milkweed, leaf fibers such as sisal, abaca, pineapple or hemp (e.g., New Zealand hemp); bast fibers e.g., flax, bagasse, hemp, jute, kenaf, linen, straw, or wood plants (pulp). Pulp fibers may be more desirable. Wood pulp fibers are especially well suited to use, and both softwood fibers (which typically originate from conifers) and hardwood fibers (typically from deciduous trees) are suitable. Parts or all of the natural short fibers may comprise pulp having fiber lengths of between 1 and 7.5 mm. The pulp fibers may constitute at least 25 wt. %, such as from 40 to 98 wt. %, specifically from 60 to 98 wt. %, more specifically from 75 to 95 wt. %, and in particular from 83 to 90 wt. % of the cellulosic fiber content.

The pulp fiber lengths may be from 1 to 5 mm, such as from 2 to 4 mm and specifically 3 mm for softwood fibers and from 0.5 to 4 mm, specifically from 1 to 3 mm (e.g., from 1 to 2 mm), and more specifically about 1.2 mm for hardwood fibers. The pulp fiber lengths for recycled fibers is a mixture of these lengths, and may be even shorter.

Cellulosic fibers may also be selected from semi-synthetic fibers, as described above, for example originating from viscose, rayon, or lyocell, whereby the use of viscose and lyocell may be desirable in certain embodiments.

The cutting of the semi-synthetic fiber bundle is normally performed to result in a single cut length, which may be altered by varying the distances between the knives of the cutting wheel. Depending on the planned use, different fiber lengths are used e.g., in the range of 2 to 25 mm, specifically from 5 to 25 mm, more specifically from 5 to 15 mm, and in particular 6 to 12 mm. The cellulosic staple fibers may all have the same or substantially the same length, or a plurality of different lengths may be used. The weight proportion of semi-synthetic fibers based on the total weight of the cellulosic fibers may be from 2 to 50 wt.-%, specifically from 5 to 50 wt.-%, and more specifically from 2 to 40 wt.-%, for example from 5 to 25 wt.-%, and in particular from 10 to 17 wt.-%.

The tissue paper ply in the present disclosure has a basis weight in the range of 8 to 50 g/m$^2$, specifically from 10 to 30 g/m$^2$, and more specifically from 12 to 25 g/m$^2$. The same applies to nonwovens and the resulting plies.

Based on the underlying compatibility of the production processes (wet forming), "tissue" production is counted among the papermaking techniques. The production of tissue is distinguished from paper production by its extremely low basis weight and its much higher tensile energy absorption index. Paper and tissue paper also differ in general with regard to the modulus of elasticity that characterizes the stress-strain properties of these planar products as a material parameter.

A tissue's high tensile energy absorption index results from the outer or inner creping. The former is produced by compression of the paper web adhering to a dry cylinder as a result of the action of a crepe doctor or in the latter instance as a result of a difference in speed between two wires ("fabrics"). This causes the still moist, plastically deformable paper web to be internally broken up by compression and shearing, thereby rendering it more stretchable under load than an uncreped paper. A high tensile energy absorption index may also be achieved by imparting to the tissue a 3D structure by means of the wires themselves. Most of the functional properties typical of tissue and tissue products result from the high tensile energy absorption index (see DIN EN 12625-4 and DIN EN 12625-5).

The tissue paper may be produced from paper-making fibers according to "Conventional Processes" as in the manufacture of "Dry Crepe Tissue" or "Wet Crepe Tissue" or "Processes for Structured Tissue" such as the Through Air Drying (TAD) manufacturing method, the manufacture of uncreped through-air dried (UCTAD) tissue, or alternative manufacturing methods e.g., the Advanced Tissue Molding System (ATMOS) of the company Voith, or Energy Efficient Technologically Advanced Drying eTAD of the company Georgia Pacific, or Structured Tissue Technology SST of the company Metso Paper. Hybrid processes like NTT (New textured Tissue) which are alterations of the conventional processes may be used, too.

The conventional dry crepe manufacturing method comprises the steps of:
 pressing and drying the wet paper fibers as a sheet on a large-diameter, heated cylinder (also called Yankee dryer); and
 subsequently detaching and creping the sheet of dried paper fibers by means of a metal blade applied against said cylinder, across its direction of rotation.

The creping operation creates undulations in the sheet across its direction of travel. The creping operation increases the thickness of the sheet, and confers elasticity and gives touch (soft touch) properties to the sheet.

The TAD manufacturing method comprises the steps of:
 molding the sheet of wet paper fibers on a fabric; and
 subsequently drying the sheet, at least partly, by means of a current of hot air passing through it.
 Subsequently, the dried sheet may be creped.

Further, in the manufacture of the tissue web to be used, a process as described in PCT/EP2015/059326 (application date: 29 Apr. 2015; title: "Tissue paper comprising pulp fibers originating from Miscanthus and method for manufacturing the same", the entire contents of which are incorporated by reference herein for the sole purpose of providing the details of such process) may be used. Specifically, reference is made to the description according to item 3 on pages 22 to 27 of that document and details of the TAD process (e.g., 3-D-shaped fabric, permeable drying cylinder) disclosed therein. The parameters described in that passage are also valid for the use of the ATMOS technology.

Once the tissue paper has been manufactured, a distinct manufacturing operation called converting operation is typically employed to form the tissue paper product (e.g., paper towel, toilet tissue, bathroom tissue or toilet paper, wiping tissue, handkerchiefs).

The polycarboxylic acid in the present disclosure may have from 2 to 12 carbon atoms in a main chain e.g., from 4 to 6 carbon atoms in a main chain, and in particular 5 carbon atoms in a main chain. In one embodiment, the organic polycarboxylic acid is a compound represented by the following formula (I):

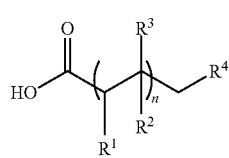
(I)

wherein
 n is 0 to 11 e.g., 1, 2 or 3, and
 $R_1$ is selected from the group consisting of a hydrogen atom, an alkyl group which may be substituted, an alkylene group which may be substituted, an oxo group, and a hydroxy group,
 $R_2$ is a hydrogen atom or a hydroxy group
 $R_3$ and $R_4$ are each independently selected from the group consisting of a hydrogen atom, an alkyl group which may be substituted, a carboxamide, a carboxyl group, an oxo group, and a hydroxy group, provided that at least one of R3 and R4 is a carboxyl group.

According to another embodiment, the organic polycarboxylic acid is selected from the group consisting of citric acid, isocitric acid, citraconic acid, tartaric acid, itaconic acid, 1,2,3 propanetricarboxylic acid, 1,2,3,4-butanetetracarboxylic acid, glutaric acid, alpha-ketoglutaric acid, malic acid, malonic acid, 2-hydroxymalonic acid, oxalic acid, oxalosuccinic acid, succinic acid, carboxy succinic acid, 1,2 dimethylsuccinic acid, adipic acid, pimelic acid, 2-methyl tricarballylic acid, aconitic acid, 1,2,4-butane tricarboxylic acid, polymers of acrylic acid, and mixtures thereof, wherein the acid may for example be citric acid.

In the present disclosure, the content of the organic polycarboxylic acid in the treatment solution based on the total amount of the solution may be from 2 to 80 wt.-%, specifically from 2.5 to 50 wt.-%, and more specifically from 10 to 20 wt.-%. The pKa value of the organic polycarboxylic acid may be between 1 and 6.5.

In one embodiment, the organic polycarboxylic acid displays a solubility in water (at 20° C.) of at least 2.0% wt-%, specifically at least 2.5 wt-%, or at least 10 wt-% (for reference, the solubility of citric acid in water is known to be 59.2% w/w at 20° C.).

In one embodiment, one carboxyl group of the organic polycarboxylic acid is covalently bound to the cellulosic fibers by forming an ester group with a cellulosic hydroxy group. In another embodiment, at least 1, such as from 1 to 9, specifically 2 to 4, and in particular 2 free carboxyl groups provide the acidic properties The ply fibrous product of the present disclosure, wherein the cellulosic fibers are covalently bound to an organic polycarboxylic acid, is obtained by treating the cellulosic fibers with organic polycarboxylic acids in the presence of an activator. At least 1, specifically 1 or 2, and in particular 1 carboxyl group is required to allow covalent binding of the organic polycarboxylic acid to the cellulosic hydroxy groups on the cellulosic fibers, and at least 1, specifically from 1 to 9, more specifically from 2 to 4, and in particular 2 free carboxyl groups provide the acidic properties. The presence of several remaining free carboxyl groups after binding results in further lowering of the pH on the surface of the ply fibrous product.

The surface layer of the ply fibrous product in the present disclosure may have a pH after rinsing of from 2.0 to 5.5, specifically from 2.5 to 5.5, and more specifically from 3.0 to 5.0 when measured according to the method described in the experimental section of the present disclosure, and/or a pH after washing in a range of from 2.0 to 5.0, specifically from 2.5 to 4.5, and more specifically from 3.0 to 4.5 when measured according to the method described the experimental section of the present disclosure. The low pH inhibits or limits bacterial growth and thus prevents spreading of pathogenic bacteria and the development of nosocomial infections. Moreover, the formation of odorous by-products may be inhibited.

In the present disclosure the ply fibrous products may be one of handkerchiefs, napkins, paper hand towels, facial tissues, wound care dressings or cleaning wipes.

In one aspect of the present disclosure, application areas of the ply fibrous product include, but are not limited to, the use of the ply fibrous product as:
(I) antibacterial wipes for personal hygiene, such as handkerchiefs, paper hand towels, toilet paper, pre-moistened toilet paper, baby wipes, wipes for feminine hygiene,
(II) wound care dressings,
(III) antibacterial wipes for food service cleaning, at home and in food production,
(IV) as cleaning wipe suitable to clean surfaces, such as hard surfaces in a domestic or hospital environment.

The present disclosure also concerns a method for producing a ply fibrous product, comprising the steps of:
(α) treating cellulosic fibers with a treatment solution comprising one or more organic polycarboxylic acids, or optionally a mixture of one or more organic polycarboxylic acids with salts thereof, preferably an organic polycarboxylic acid as defined in the present disclosure, and an activator,
(β) optionally drying, and
(γ) curing to obtain the ply fibrous product.

In one specific embodiment, the organic polycarboxylic acid is mixed with the salt thereof, wherein the salt is the salt corresponding to the selected acid. When mixing the organic polycarboxylic acid and the corresponding salt thereof in a molar ratio of 1:1, the mixture shows buffering capacity which stabilizes the pH of the resulting treatment solution.

In another embodiment, the treatment with the treatment solution according to the present disclosure is performed by soaking, spraying, slot-coating, or foam-coating, whereby soaking or spraying may be desirable.

In a further embodiment, the method for producing a ply fibrous product is further specified by one or more, or even all of the following conditions:
(i) the concentration of the organic polycarboxylic acid in the treatment solution is from 2 to 80 wt.-%, specifically from 2.5 to 50 wt.-% and more specifically from 10 to 20% wt.-% based on the total weight of the treatment solution,
(ii) the treatment time is 10 sec to 2 h, specifically from 30 sec to 1 h 15 min, and in particular 5 min,
(iii) the curing time is from 1 to 10 min, specifically from 2 to 8 min, and in particular 5 min,
(iv) the curing temperature is from 100° C. to 200° C., specifically from 110° C. to 180° C., and more specifically from 140° C. to 170° C.

In a specific embodiment, the treatment time as mentioned above is to be understood as the soaking time.

The activator in the present disclosure may be selected from the group consisting of sodium hypophosphite monohydrate, N-N'-carbonyldiimidazole (CDI), p-toluenesulfonylchloride (TosCl), N,N'-dicyclohexyl-carbodiimide in combination with 4-pyrrolidinopyridine or 4-dimethylaminopyridine. The organic polycarboxylic acid and the activator are dissolved in a treatment solution, such as water, at a molar ratio (acid:activator) of 0.8 to 1.2, and specifically 0.9 to 1.1 such as 1.0.

According to another aspect of the present disclosure, the treatment solution comprising an organic polycarboxylic acid may further comprise a surfactant. The surfactant lowers the surface tension of the treatment solution in which it is dissolved. This is especially relevant for materials containing synthetic fibers exhibiting a high degree of hydrophobicity, for example fibers comprising PE, PP and the like.

The present disclosure also concerns the use of the ply fibrous product for reducing the amount of unwanted bacteria or inhibiting their growth. In one embodiment the unwanted bacteria are selected from the group consisting of *E. coli, E. faecalis, S. epidermidis, S. aureus* and *K. pneumonia*. According to another aspect of the present disclosure, the log CFU/ml of bacteria is reduced by at least 5%, such as 10-20%, in particular 15%.

3 EXAMPLES 3.1 Starting Materials and Chemicals

Substrates (Fibrous Products) for Treatment

Different types of nonwovens were used as follows:
Viscose-based nonwoven (pure viscose fibers, TORK Long-lasting, 70 g/m$^2$)
Viscose/PET-based nonwoven (60% viscose fibers and 40% polyester fibers by weight, Suominen, 70 g/m$^2$)
Pulp/PP-based nonwoven (65% by weight pulp fibers and 35% by weight polypropylene fibers, TORK Industrial Cleaning Cloth (520), 65 g/m$^2$)

Chemicals

For the modification of the ply fibrous product, the following chemicals were used:
Citric acid (Thermo Fisher GmbH, Karlsruhe, Germany)
Sodium hypophosphite monohydrate ($NaH_2PO_2 \cdot H_2O$, Thermo Fisher GmbH, Karlsruhe, Germany)
Citric acid ammonium salt (Acros Organics BVBA, Loughborough, United Kingdom)
Lactic acid (Acros Organics BVBA, Loughborough, United Kingdom)

3.2 Nonwoven Treatment with Organic Polycarboxylic Acids

The dry weight of the substrates to be treated was determined after conditioning the same at 50% relative humidity and at 20° C.

The nonwoven was soaked in a treatment solution containing (i) citric acid or an equimolar mixture of citric acid and citric acid ammonium salt as well as (ii) sodium hypophosphite monohydrate as an activator (molar ratio organic polycarboxylic acid: activator=1:1). The treated nonwoven was wrung out, dried and cured at 160° C. for 5 minutes.

3.3 pH Measurement on Surface of Nonwoven

The pH of the surface of nonwoven viscose-, viscose-PET or pulp/PP-based wipes was assessed after rinsing and/or after washing. Samples treated with an organic polycarboxylic acid were compared to untreated samples and to samples treated with organic monocarboxylic acids. The pH of the surface of the nonwoven sample was measured using a pH meter (VWR™ sympHony, SB80PI) and a flat pH electrode (HAMILTON Flattrode). The nonwoven sample was rinsed once in tap water and wrung out prior to measurement. The pH meter rod was rinsed with deionized water and dipped in 0.9% NaCl solution. A small droplet of saline solution (0.9% NaCl) was added to the tip of the electrode. The electrode tip was then brought in contact with the different nonwoven materials in order to wet the nonwoven sample at the point of measurement. The pH was measured at three different spots on the nonwoven and the average value was noted.

3.4 Rinsing or Washing of Nonwoven with Water

After curing (see item 3.2), the nonwoven material was rinsed in lukewarm water and the pH was measured, according to the above method. The rinsing of the treated materials was conducted as follows: the nonwoven material was dipped in a 7 L plastic beaker with lukewarm water and wrung out. Then, fresh water was added to the beaker and the procedure was repeated once. After rinsing, the nonwoven was thoroughly wrung out before the pH measurement. In one embodiment the "lukewarm" water may have a temperature of 30 to 40° C. e.g., 35° C.

If applicable, the treated nonwovens were also washed in a household washing machine (model: WKG130 NDS TDos, Miele) at 40° C. using a washing detergent (Fintvatt, Grumme). The amount of washing detergent may be determined by the automatic dosing system incorporated in the washing machine. After one laundry cycle, the pH of the nonwoven surface was measured again applying the above method.

Example 1-1

Sample treatment with organic polycarboxylic acids was conducted as set out in item 3.2. Viscose material was employed as nonwoven material and treated with a treatment solution containing 20 wt.-% citric acid (molar mass: 192.12 g/mol) and 10 wt.-% sodium hypophosphite monohydrate (105.99 g/mol) based on the total weight of the solution, i.e., at a molar ratio (polycarboxylic acid/activator) of about 0.9. The soaking time was 5 minutes.

Washing was conducted according to the general method described in item 3.4.

The pH value of the surface of the nonwoven after washing was 3.7 as determined by the method in item 3.3.

Examples 1-2 to 6-3 and Reference Examples 1 to 6

Sample preparation was conducted in the same manner as set forth in Example 1-1 apart from the differences shown in Table 1 and further explained below. Reference Examples were not subjected to any treatment with organic polycarboxylic acids before rinsing and/or washing with water.

In Examples 1-2, 2-2 and 3 to 6, the soaking time was reduced to 30 seconds.

In Examples 2-1, 2-2 and Reference Example 2, a viscose/PET-based nonwoven was employed.

In Examples 4-1 to 4-3, 6-1 to 6-3 as well as Reference Examples 4 and 6, Pulp/PP-based nonwoven were employed. Further, for comparative purposes, 10 wt.-% lactic acid, an organic monocarboxylic acid, was used in Examples 3-3 and 4-3.

In Examples 3-2 and 4-2, a mixture of 5 wt.-% citric acid and 5 wt.-% acid ammonium salt was employed.

In Examples 3-1, 5-1 and 6-1, 10 wt.-% citric acid was used. In Examples 5-2 and 6-2, 5 wt.-% of citric acid was used. In Examples 5-3 and 6-3, 2.5 wt.-% citric acid was used.

TABLE 1

| Example | Ply fibrous product | Organic polycarboxylic acid | Organic Poly-Carboxylic acid [wt.-%] | Soaking time | pH after rinsing | pH after washing |
| --- | --- | --- | --- | --- | --- | --- |
| 1-1 | Viscose | Citric acid | 20 | 5 min | — | 3.7* |
| 1-2 | Viscose | Citric acid | 20 | 30 sec | — | 3.4* |
| Reference Example 1 | Viscose | — | — | — | — | 5.3 |
| 2-1 | Viscose/PET | Citric acid | 20 | 5 min | —* | 4.2 |
| 2-2 | Viscose/PET | Citric acid | 20 | 30 sec | — | 4.1* |
| Reference Example 2 | Viscose/PET | — | — | — | — | 5.1 |
| 3-1 | Viscose | Citric acid | 10 | 30 sec | 4.2 | — |
| 3-2 | Viscose | Citric acid Citric acid ammonium salt | 5 5 | 30 sec | 4.6 | — |
| 3-3 (comp) | Viscose | Lactic acid | 10 | 30 sec | 6.2 | — |
| Reference Example 3 | Viscose | — | — | — | 6.0 | — |
| 4-1 | Pulp/PP | Citric acid | 10 | 30 sec | 4.3 | — |
| 4-2 | Pulp/PP | Citric acid Citric acid ammonium salt | 5 5 | 30 sec | 4.5 | — |
| 4-3 (comp.) | Pulp/PP | Lactic acid | 10 | 30 sec | 6.2 | — |
| Reference Example 4 | Pulp/PP | — | — | — | 6.4 | — |
| 5-1 | Viscose | Citric acid | 10 | 30 sec | 3.1* | 5.0 |
| 5-2 | Viscose | Citric acid | 5 | 30 sec | 3.1 | 5.8 |
| 5-3 | Viscose | Citric acid | 2.5 | 30 sec | 3.6 | 6.0 |
| Reference Example 5 | Viscose | — | — | — | 6.0* | — |
| 6-1 | Pulp/PP | Citric acid | 10 | 30 sec | 3.1* | 5.3 |
| 6-2 | Pulp/PP | Citric acid | 5 | 30 sec | 3.1 | 5.8 |
| 6-3 | Pulp/PP | Citric acid | 2.5 | 30 sec | 3.6 | 6.0 |
| Reference Example 6 | Pulp/PP | — | — | — | 6.4* | — |

*Further, antibacterial tests were performed using the standard test method AATCC 100 (see also item 3.5).

The test data in Table 1 confirm that all nonwovens treated with an organic polycarboxylic acid such as citric acid display a long-lasting acidic pH even after having been rinsed with water. By contrast, the treatment with lactic acid (comparative examples 3-3 or 4-3) led to pH values very close to those of the corresponding reference examples. This difference may only be accounted for by the formation of covalent chemical bonds (ester bonds) between a carboxyl group of the polycarboxylic acid (citric acid) and hydroxy groups of the cellulosic fibers present in all substrates. Incidentally, the presence of covalent bonds (ester carbonyl bonds) may also be shown by FTIR analysis (see Bing Li, et al in Cellulose, April 2015, Volume 22, Issue 2, pp 1295-1309 *"Preparation and catalytic performance of Fe(III)-citric acid-modified cotton fiber complex as a novel cellulose fiber-supported heterogeneous photo-Fenton catalyst"*).

It may further be seen that in most cases, especially if the amount of polycarboxylic acid e.g., citric acid, was at least 5 wt. %, specifically at least 10 wt. %, based on the total weight of the solution, a long-lasting acidic pH may be achieved in the nonwovens treated with an organic polycarboxylic acid, even after washing with a washing detergent, when compared to the untreated nonwovens. Therefore, the long-lasting antibacterial effect of a nonwoven-based ply fibrous product is also given after washing the products. Thus, the nonwoven-based ply fibrous product of the present disclosure may be reused without losing their antibacterial activity after having been washed.

3.5 Antibacterial Effect

To determine if the acid treatment had an antimicrobial effect, treated nonwovens (rinsed or washed) and untreated nonwovens as reference material were examined. The antibacterial effect was measured using a modified version of the standard method AATCC100 "Assessment of Antibacterial Finishes on Textile Materials" (see https://antimicrobial.specialtytesting.com/products/aatcc-100-assessment-of-antibacterial-finishes-on-textile-materials).

Examples 1-1, 2-1, 2-2 and Reference Example 2

Bacterial strains of *S. aureus* (P5) and *K. pneumonia* (P119) were blended into 100% nutrient broth (tryptic soy broth, TSB 211825, Difco). The initial concentration was $10^5$ CFU/ml. 1 ml bacterial suspension was added to the different nonwoven samples and incubated at 35° C. for 6 hours. After incubation, bacteria were removed from the nonwoven using stomacher and Letheen Broth (Acumedia) and plated on trypticase Soy Agar, TSA, 211043, from BBL).

Figure 1B:
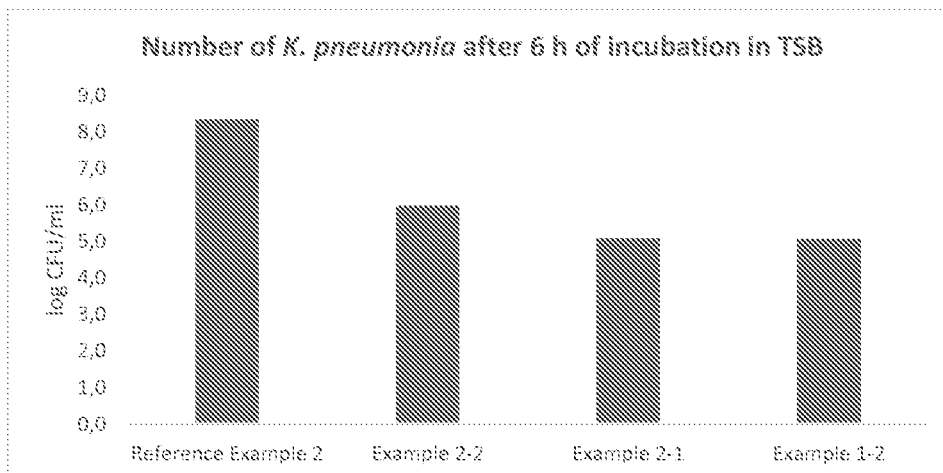

FIGS. 1a-1b show the number of bacteria after 6 hours of incubation (35° C.).

The results clearly show that the presence of organic polycarboxylic acids covalently bound to the cellulosic fibers within the ply inhibits bacterial growth. No growth of *S. aureus* (FIG. 1a) was observed for the treated viscose and viscose/PET-based nonwovens. Only slight growth of *K. pneumonia* (FIG. 1b) was observed after 30 seconds soaking time (Example 2-2).

In contrast, bacteria in the untreated material were able to grow 2-3 log units up to $10^7$-$10^8$ CFU/ml compared to the initial concentration of $10^5$ CFU/ml (Reference Example 2).

By inhibiting or limiting the bacterial growth of *E. coli* and *K. pneumonia*, the danger of spreading of pathogenic bacteria and the development of nosocomial infections may be reduced. Moreover, a permanently slightly acidic pH inhibits or limits bacterial growth and reduces the formation of odorous by-products due to bacterial metabolism in the ply fibrous products of the present disclosure.

Examples 5-1, 6-1 and Reference Examples 5 and 6

Bacterial strains of *E. coli* (P2), *E. faecalis* (P120), and *S. epidermidis* (P136) were blended into 5% nutrient broth (TSB and saline, 0,9%). The initial concentration was $10^5$ CFU/ml. 1 ml bacterial suspension was added to the different nonwoven samples and incubated at 35° C. for 6 hours. After incubation, bacteria were removed from the nonwoven using stomacher and Letheen Broth and plated on TSA.

Figure 2A:
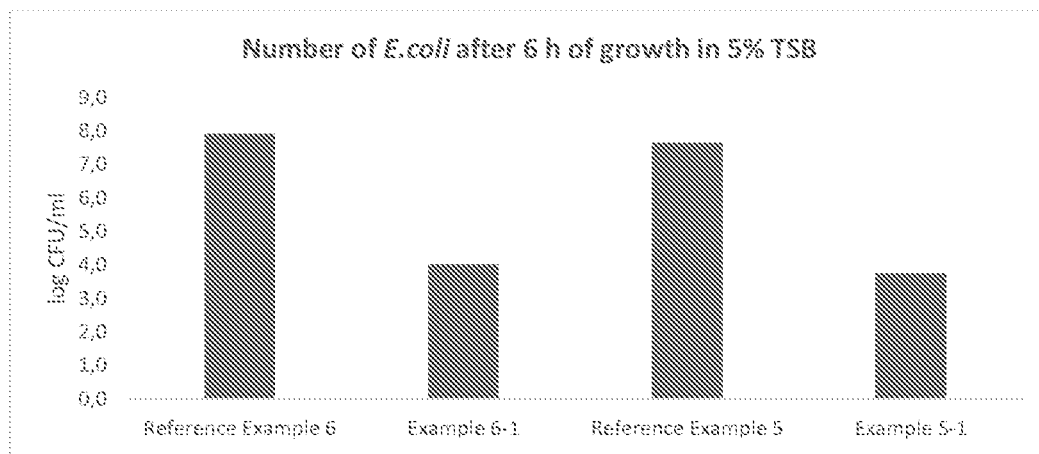
FIGS. 2a-2c show bacteria numbers after 6 hours of contact with *E. coli*, *E. faecalis*, and *S. epidermidis* in Pulp/PP- and viscose-based nonwovens treated with organic polycarboxylic acids compared to untreated material.
Figure 2B:
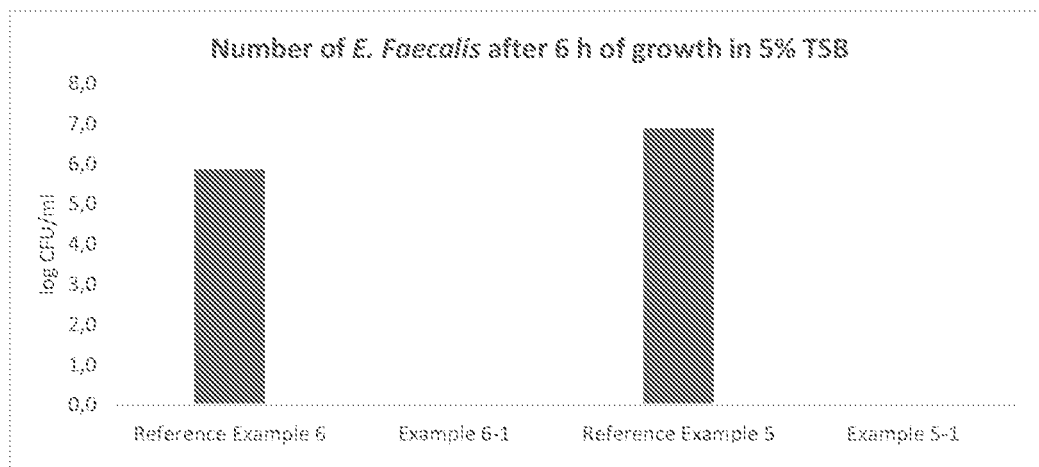
Figure 2C:
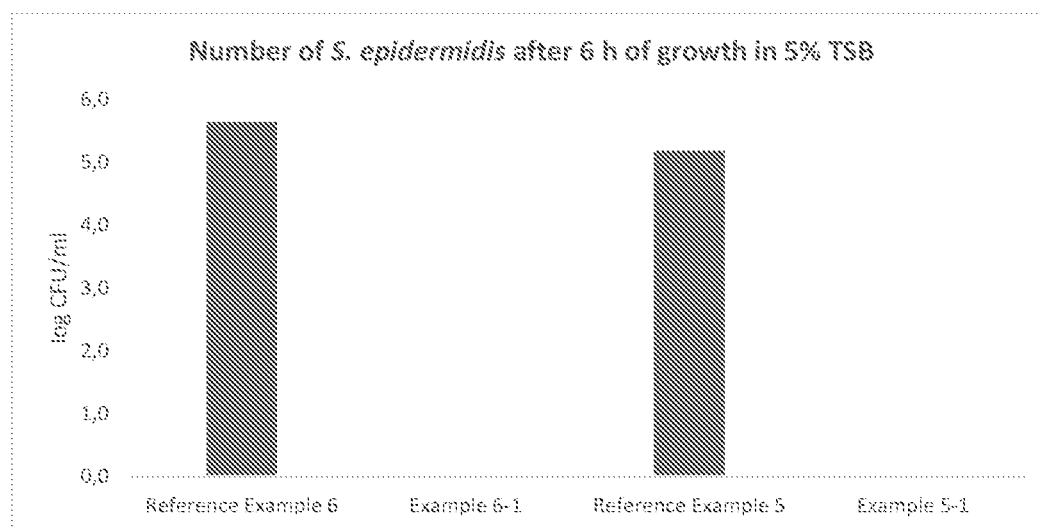

FIGS. 2a-2c show number of bacteria after 6 hours of incubation in 5% TSB at 35° C. The detection limit in this experiment is 200 bacteria/ml i.e., 2.3 log CFU/ml.

*E. coli* bacteria (FIG. 2a) in the Reference Examples 5 and 6 were able to grow about 3 log CFU/ml, while the ply fibrous products in the present disclosure exert a growth inhibiting effect of 1 log CFU/ml, compared to the initial concentration. *E. faecalis* (FIG. 2b) and *S. epidermidis* (FIG. 2c) were not able grow at all in the ply fibrous products in the present disclosure, while bacterial growth was still observed in case of Reference Examples 5 and 6.

Thus, it is clearly shown that the presence of organic polycarboxylic acids bound covalently to the cellulosic fibers within the ply fibrous product inhibits, or limits bacterial growth. Therefore, the risk of spreading of unwanted bacteria (e.g., pathogenic or nosocomial bacteria) as well as the associated development of odors is reduced.

The invention claimed is:

1. A ply fibrous product comprising at least one nonwoven ply, wherein the nonwoven ply comprises cellulosic fibers, wherein said nonwoven ply is treated with an organic polycarboxylic acid, and wherein the organic polycarboxylic acid has at least one carboxyl group covalently bound to the cellulosic fibers and at least one free carboxyl group, wherein a surface of the ply fibrous product has a pH after washing in a range of from 2.0 to 5.0, and
    wherein the nonwoven ply comprises
        (A) cellulosic fibers selected from
            (A1) natural fibers,
            (A2) semi-synthetic fibers, and
            (A3) a mixture of natural fibers and semi-synthetic fibers,
        wherein the nonwoven ply optionally comprises
        (B) synthetic fibers selected from the group consisting of polyethylene, polypropylene, polyethylene terephthalate, and polyester.

2. The ply fibrous product according to claim 1, wherein the organic polycarboxylic acid has two to ten carboxyl groups.

3. The ply fibrous product according to claim 1, wherein the organic polycarboxylic acid has 2 to 12 carbon atoms in a main chain.

4. The ply fibrous product according to claim 1, wherein at least one carboxyl group is covalently bound to the cellulosic fibers by forming an ester group with a cellulosic hydroxy group.

5. The ply fibrous product according to claim 1,
    wherein the weight proportion of cellulosic fibers based on the total weight of the ply fibrous product is 10 to 80 wt.-%, and
wherein the weight proportion of synthetic fibers based on the total weight of the ply fibrous product is 20 to 90 wt.-%.

6. The ply fibrous product according to claim 1, wherein the ply fibrous product is a multiply tissue product including the nonwoven ply.

7. The ply fibrous product according to claim 1, wherein the product is selected from handkerchiefs, napkins, paper hand towels, facial tissues, wound care dressings and cleaning wipes.

8. The ply fibrous product according to claim 1, wherein the cellulosic fibers comprising an organic polycarboxylic acid are obtainable by treating cellulosic fibers with an organic polycarboxylic acid, in the presence of an activator.

9. The ply fibrous product according to claim 8, wherein the activator is selected from the group consisting of sodium hypophosphite monohydrate, N-N'-carbonyldiimidazole, p-toluenesulfonylchloride and N,N'-dicyclohexyl-carbodiimide in combination with 4-pyrrolidino-pyridine or 4-dimethylaminopyridine.

10. The ply fibrous product according to claim 1, wherein the surface of the ply fibrous product has a pH after rinsing in a range of from 2.0 to 5.5.

11. The ply fibrous product according to claim 1, wherein the product is:
   (I) antibacterial wipe for personal hygiene,
   (II) wound care dressing,
   (III) antibacterial wipe for food service cleaning, at home and in food production, or
   (IV) as cleaning wipe suitable to clean surfaces.

12. A method for reducing the amount of unwanted bacteria or inhibiting their growth, the method comprising using the ply fibrous product of claim 1, wherein the unwanted bacteria are selected from the group consisting of *E. coli, E. faecalis, S. epidermidis, S. aureus* and *K. pneumonia*.

13. The method according to claim 12, wherein the log CFU/ml of unwanted bacteria is reduced at least 5%.

14. The ply fibrous product according to claim 1, wherein the organic polycarboxylic acid is citric acid.

15. The ply fibrous product according to claim 1, wherein the at least one free carboxyl group is configured to release a proton.

16. Method for producing a ply fibrous product comprising at least one nonwoven ply, wherein the nonwoven ply comprises cellulosic fibers, the method comprising the steps of
   ($\alpha$) treating the nonwoven ply comprising the cellulosic fibers with a treatment solution comprising one or more organic polycarboxylic acid, or optionally a mixture of one or more organic polycarboxylic acids with salts thereof, and an activator;
   ($\beta$) optionally drying; and
   ($\gamma$) curing to obtain the ply fibrous product,
   wherein a surface of the ply fibrous product has a pH after washing in a range of from 2.0 to 5.0, and
   wherein the nonwoven ply comprises
   (A) cellulosic fibers selected from
      (A1) natural fibers,
      (A2) semi-synthetic fibers, and
      (A3) a mixture of natural fibers and semi-synthetic fibers,
   wherein the nonwoven ply optionally comprises
   (B) synthetic fibers selected from the group consisting of polyethylene, polypropylene, polyethylene terephthalate, and polyester.

17. The method according to claim 16, wherein at least one of the following conditions are fulfilled:
   (i) the concentration of the organic polycarboxylic acid in the treatment solution is 2 to 80 wt.-% based on the total weight of the treatment solution,
   (ii) the treatment time is 10 sec to 2 h,
   (iii) the curing time is 1 to 10 min,
   (iv) the curing temperature is 100° C. to 200° C.

* * * * *